Nov. 18, 1958

W. I. HAAS 2,861,221

OFF-FREQUENCY SYNCHRONIZED STROBOSCOPE

Filed May 20, 1955

INVENTOR.
WILLIAM I. HAAS
BY
Killman and Kerst
ATTORNEYS

Nov. 18, 1958 W. I. HAAS 2,861,221
OFF-FREQUENCY SYNCHRONIZED STROBOSCOPE
Filed May 20, 1955 2 Sheets-Sheet 2

INVENTOR.
WILLIAM I. HAAS
BY
*Killman and Kerst*
ATTORNEYS

United States Patent Office 2,861,221
Patented Nov. 18, 1958

2,861,221

OFF-FREQUENCY SYNCHRONIZED STROBOSCOPE

William I. Haas, York, Pa., assignor to Bendix Aviation Corporation, Towson, Md., a corporation of Delaware Application May 20, 1955, Serial No. 509,885

5 Claims. (Cl. 315—194)

The present invention relates to stroboscopes, and in particular, to stroboscopes that may be synchronized to operate at frequencies other than those of the moving objects to be viewed.

The use of stroboscopes to view phenomena occurring in objects that are subject to periodic variations is well known in the art. Generally, the stroboscope will contain a variable internal oscillator that may be adjusted to produce various signals for energizing the stroboscope illuminating tube. For viewing objects at one or more points during the cycle of the mechanical variation, the tube must be energized at either the frequency of the variation or some multiple or sub-multiple thereof. In certain applications the stroboscope may be electrically synchronized to the mechanical system in order to eliminate drifting between the two frequencies.

When it is desired to view the phenomenon at a slightly different time each cycle so that a study thereof throughout the entire cycle may be made, it is customary to set the stroboscope internal oscillator at a frequency slightly different from that of the variation. The object will then appear to vary at a frequency equal to the difference between the frequencies of the variation and the stroboscope.

This method produces several undesirable results. One is the inability of some oscillators to maintain a constant frequency output so that the apparent frequency of the variations will remain constant when the object is varying at a constant frequency. Another is the inability to maintain constant the apparent frequency when the frequecy of the variation of the object is varied over a band of frequencies.

The present invention provides a means for overcoming these problems so that the phenomenon may be viewed at a constant apparent frequency when the frequency of the variation of the object is fixed or varied over a predetermined band.

An object of this present invention is to provide a stroboscope that will permit the observance of a phenomenon at a constant apparent frequency when the device under test is subjected to constant periodic variations.

Another object of the present invention is to provide a stroboscope that will permit the observance of a phenomenon at a constant apparent frequency when the device under test is subjected to periodic variations that vary over a band of frequencies.

These and other objects are apparent in a system wherein an electrical signal obtained from and varying at the frequency of the device under test is modulated by a controlled signal producing source to produce a signal the frequency of which is different from the frequency of variation of the device by an amount equal to the apparent frequency desired for observing purposes.

Referring to the drawings.

Figure 1:
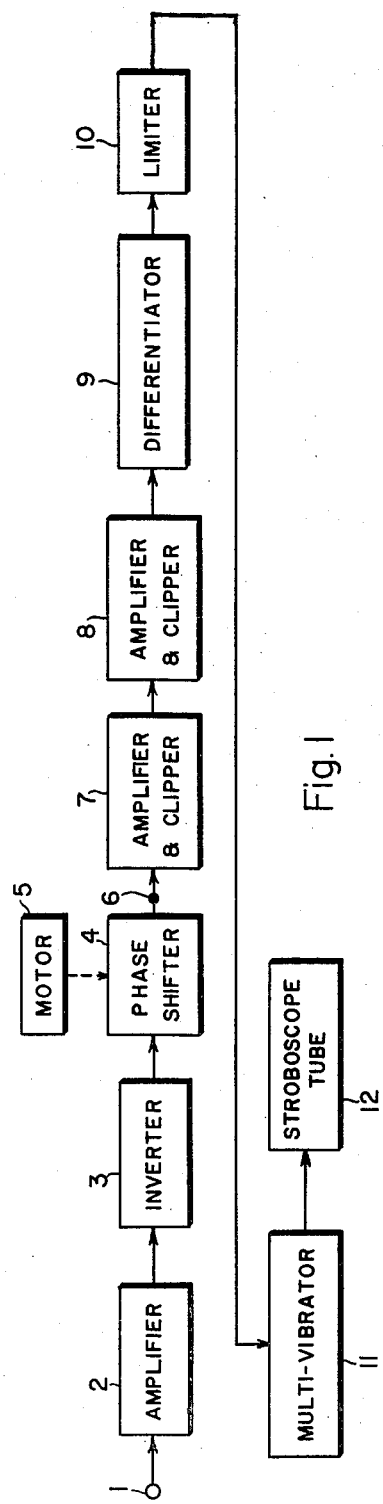
Fig. 1 is a block diagram illustrating the invention.

Referring in particular to Fig. 1, an input terminal 1 is provided for inserting the signal obtained from a transducer or other means associated with the device under test. An amplifying circuit 2 amplifies the input signal, which is coupled to an inverter 3. The output signals from the inverter 3 are coupled to a phase shifting circuit 4. When the phase shifter 4 is energized by a motor 5, the frequency of the signal appearing at a point 6 will be equal to the frequency of the signal at the terminal 1, plus or minus the number of revolutions per second introduced to the phase shifter 4 by the motor 5. The output of the phase shifter 4 is coupled into an amplifier-clipper circuit 7. The output from the circuit 7 is coupled into a second amplifier-clipper circuit 8, the output of which is differentiated by a differentiator 9. A limiter 10 prohibits the output of the differentiator from exceeding a predetermined value, which is then used to drive a multivibrator 11. The output of the multivibrator 11 is used to ionize a tube 12 so as to produce the desired flash of light.

Figure 2:
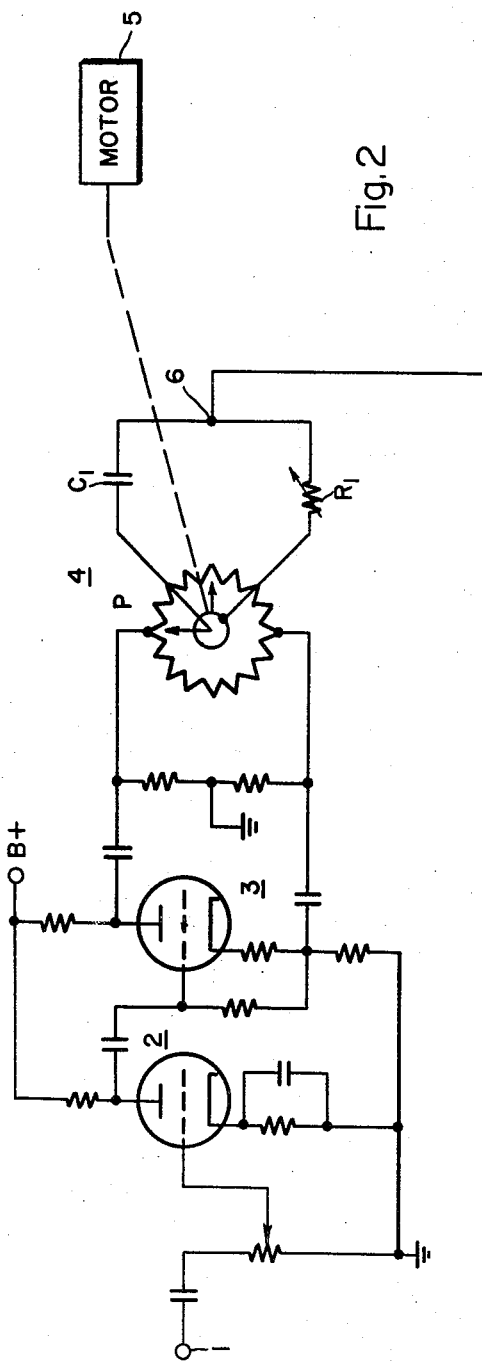
Fig. 2 is a schematic diagram illustrating a circuit conforming to the block diagram depicted in Fig. 1.
Figure 2:
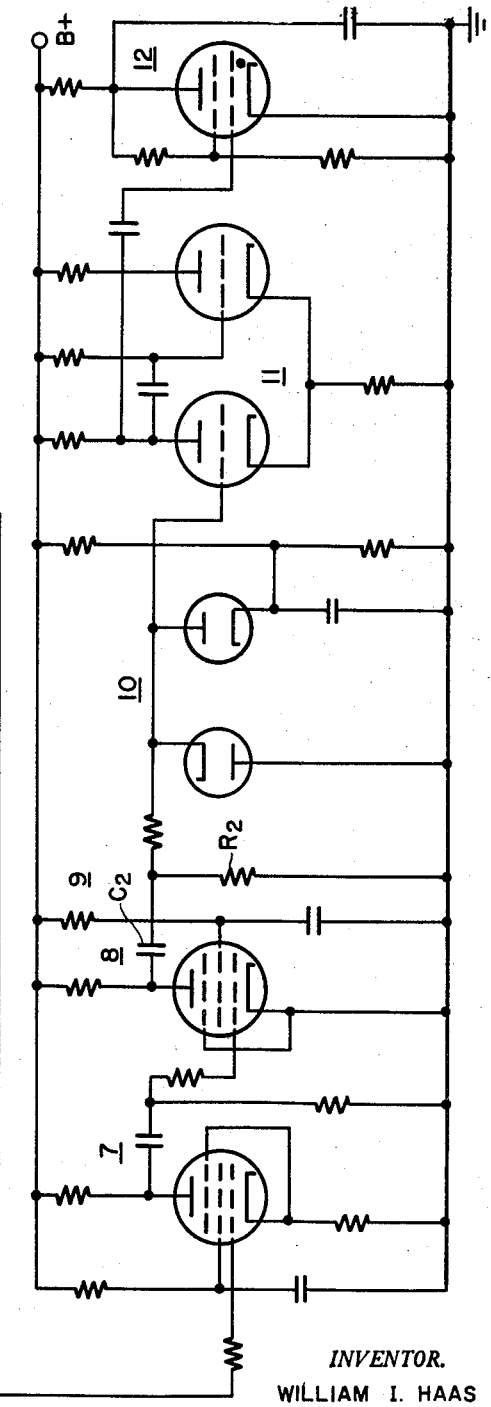

Fig. 2 is a schematic diagram of a circuit conforming to the block diagram of Fig. 1. Symbol numbers of identical parts have been retained. The phase shifter 4 comprises a potentiometer P, a capacitor $C_1$, and a resistor $R_1$. The potentiometer P has two taps on its continuous winding that are 180° displaced with respect to one another. Two contact arms, which are displaced 90° with respect to one another, couple signals to the resistor $R_1$ and the capacitor $C_1$. The value of the resistor $R_1$ is adjusted to equal the impedance of the capacitor $C_1$ at the frequency of the signal coupled to the terminal 1.

In operation, the phase shifter 4 modulates the input signal to produce an output signal of a different frequency by causing a continuous phase shift to occur in the input signal. The phase shift is directly dependent upon the rotational speed of the arms of the potentiometer P. The phase shift may be additive or subtractive, depending upon the direction of rotation of the arms.

The differentiator 9 comprises a capacitor $C_2$ and a resistor $R_2$. The amplifiers and clippers 7 and 8, limiter 10, multivibrator 11, and stroboscope illuminating tube 12 are of conventional form and their detailed description is believed to be unnecessary.

Figure 3:
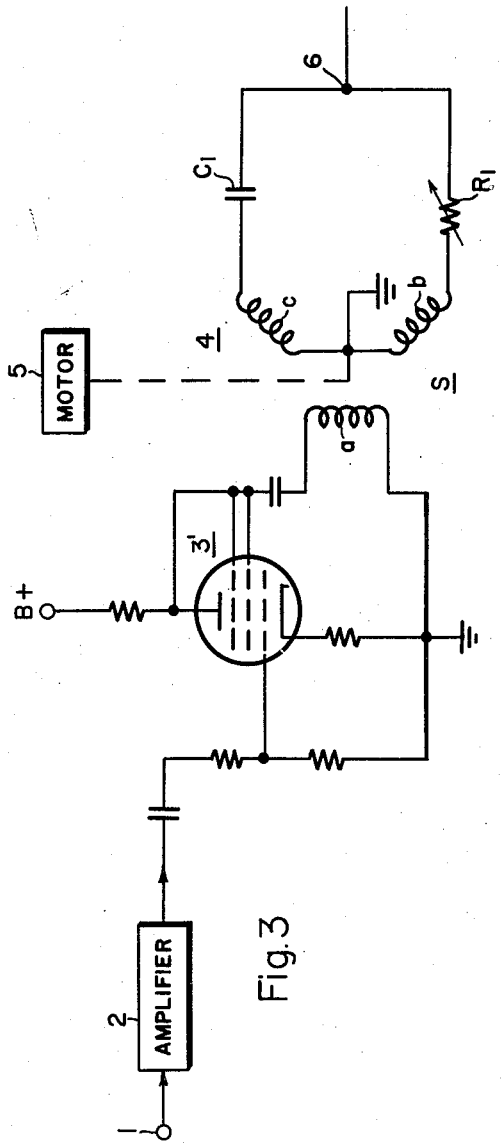
Fig. 3 is a schematic diagram of a variation in the circuit of Fig. 2.

A synchro S, comprising windings $a$, $b$, and $c$, may be substituted for the potentiometer P of Fig. 2. This is illustrated in Fig. 3. The synchro S offers several advantages over the potentiometer P in that it is more easily manufactured and it does not have any moving parts that are inclined to wear as rapidly as some in a potentiometer. The use of the synchro S does away with the necessity of a phase inverter. An amplifier 3' has been substituted.

An analysis for counter-clockwise rotation of the phase shifter 4 of Fig. 3 is as follows: Assume the input wave to the winding $a$ to be $I \sin \omega t$, and the angle between the center lines of the windings $a$ and $b$ to be $\theta$. Therefore, the voltage across the winding $b$ will be $$E_b = E \cos \omega t \cos \theta$$

and the voltage across the windings $c$ will be $$E_b = E \cos \omega t \sin \theta$$

When the value of the resistor $R_1$ equals the impedance of the capacitor $C_1$ at the frequency of the input signal, the signal $E_b$ will be shifted $+45°$ and the signal $E_c$ will be shifted $-45°$ at the point 6. The signal at the point 6 will therefore be:

$$E_6 = \frac{E}{\sqrt{2}} \sin (\omega t + \theta + 45°)$$

Therefore, if $\theta$ is a function of time, then the frequency in radians is $(\omega+\alpha)$, where $\alpha t=\theta$. The above expression will apply also to the form of the invention illustrated in Fig. 2 and $\theta$ may be either a positive or a negative function of time.

Although several variations of the invention have been illustrated and discussed in explaining the operation thereof, it is to be understood that there are other means for providing phase shifting and signal shaping that may be used without departing from the scope of the invention.

What is claimed is:

1. A stroboscope for observing a periodic event comprising gas discharge trigger tube light source means, means for deriving a reference signal having a periodicity which is an integral multiple of the period of said event, means for automatically and continually phase shifting said reference signal to produce a phase shifted signal such that a constant difference is maintained between the frequency of said reference signal and the frequency of said phase shifted signal, means responsive to said phase shifted signal for generating a triggering waveform synchronized therewith, and means responsive to said triggering waveform for synchronizing the flashing of said tube therewith.

2. Apparatus for synchronizing the flashing of a stroboscope illuminating tube in relation to a periodic event comprising means for deriving a reference signal having a periodicity which is an integral multiple of the period of said event, a continuous phase shifter having input and output circuits, means for coupling said reference signal to said input circuit, automatic means for operating said phase shifter and continually changing the phase shift of signals appearing at said output circuit such that a constant difference is maintained between the frequency of said reference signal at said input circuit and the frequency of phase shifted signals at said output circuit and that said difference is directly proportional to the rate at which said phase shift is changing, and a utilization circuit responsive to signals at said output circuit for generating synchronizing signals for flashing said tube which are synchronized with said phase shifted signals.

3. Apparatus for synchronizing the flashing of a stroboscope illuminating tube in relation to a periodic event comprising means for deriving a reference signal having a periodicity which is an integral multiple of the period of said event, a continuous rotary phase shifter having input and output circuits, means for coupling said reference signal to said input circuit, motor means for continually rotating said phase shifter to change the phase of signals at said output circuit at a rate directly proportional to the rate at which said phase shifter is rotated, and a utilization circuit responsive to signals at said output circuit for generating synchronizing signals such that a constant difference is maintained between the frequency of said event and the frequency of said synchronizing signals and that said difference is directly proportional to the rate at which said phase shifter is rotated.

4. Apparatus for synchronizing the flashing of a stroboscope illuminating tube in relation to a periodic event comprising means for deriving a reference signal having a periodicity which is an integral multiple of the period of said event, means responsive to said reference signal and including a phase inverter for obtaining a pair of balanced phase-opposed signals having the frequency of said reference signal, a continuous rotary circular potentiometer, a pair of relatively fixed rotatable contacts for contacting said potentiometer at points spaced a quarter of the circumference thereof, a circuit respectively coupling said balanced phase-opposed signals to diametrically opposed points on said potentiometer, motor means for rotating said rotatable contacts at a predetermined rate, a resistor, a capacitor, a circuit serially connecting said resistor and a trigger waveform generator coupled to the junction of said resistor and said capacitor for producing a trigger waveform synchronized with the frequency produced by adding the frequency of said reference signal and the frequency of rotation of said potentiometer.

5. Apparatus for synchronizing the flashing of a stroboscope illuminating tube in relation to a periodic event comprising means for deriving a reference signal having a periodicity which is an integral multiple of the period of said event, said reference signal appearing at reference signal terminals, a synchronous generator having relatively rotatable windings including a pair of relatively fixed windings joined at one end and positioned 90 electrical degrees from each other, one of said relatively rotatable windings other than said relatively fixed windings being one terminal of the input-output terminals of a phase shift network, motor means for rotating said relatively rotatable windings at a predetermined rate, a resistor, a capacitor, a circuit serially connecting said resistor and said capacitor between the free ends of said relatively fixed windings, the junction between said resistor and said capacitor constituting the other terminal of said phase shift network, a trigger waveform generator having a synchronizing input circuit, and circuit means coupling said input-output terminals of said phase shift network between said reference signal terminals and said synchronizing input circuit for producing a trigger waveform synchronized with the frequency produced by adding the frequency of said reference signal and the frequency of rotation of said generator.

References Cited in the file of this patent

UNITED STATES PATENTS

| | | |
|---|---|---|
| 2,414,916 | Yardeny | Jan. 28, 1947 |
| 2,449,651 | Hathaway | Sept. 21, 1948 |
| 2,476,790 | Willis | July 19, 1949 |
| 2,533,567 | Erickson | Dec. 12, 1950 |

FOREIGN PATENTS

| | | |
|---|---|---|
| 686,099 | Great Britain | Jan. 21, 1953 |